No. 748,556. PATENTED DEC. 29, 1903.
B. HOLTHAUS.
MOWING MACHINE.
APPLICATION FILED JUNE 1, 1903.
NO MODEL. 4 SHEETS—SHEET 1.
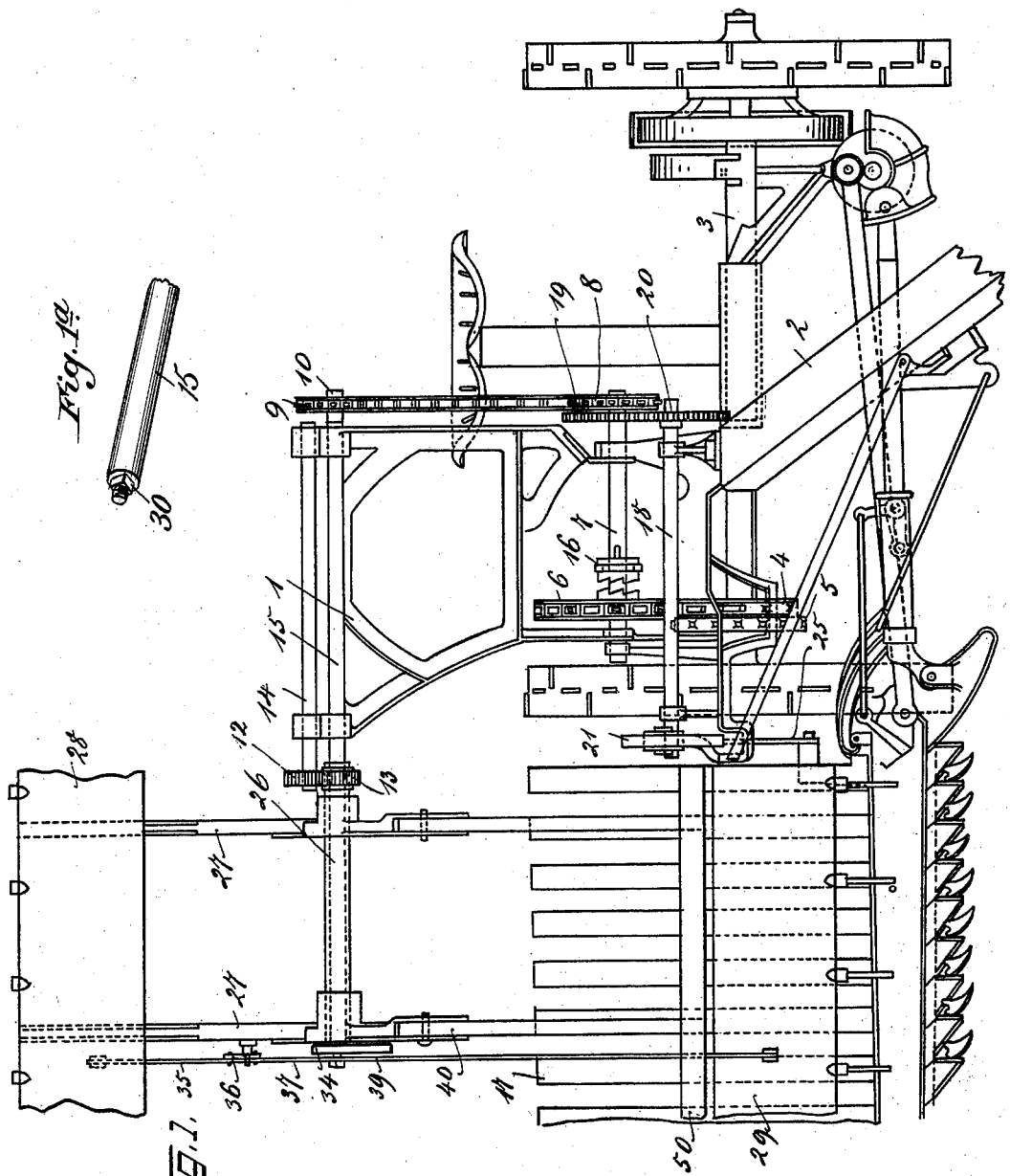
Witnesses:
Anton Glaetzner,
Bertha M. Smith.
Inventor:
Bernard Holthaus
by George T. Massie
his attorney No. 748,556. PATENTED DEC. 29, 1903.
B. HOLTHAUS.
MOWING MACHINE.
APPLICATION FILED JUNE 1, 1903.
NO MODEL. 4 SHEETS—SHEET 2.
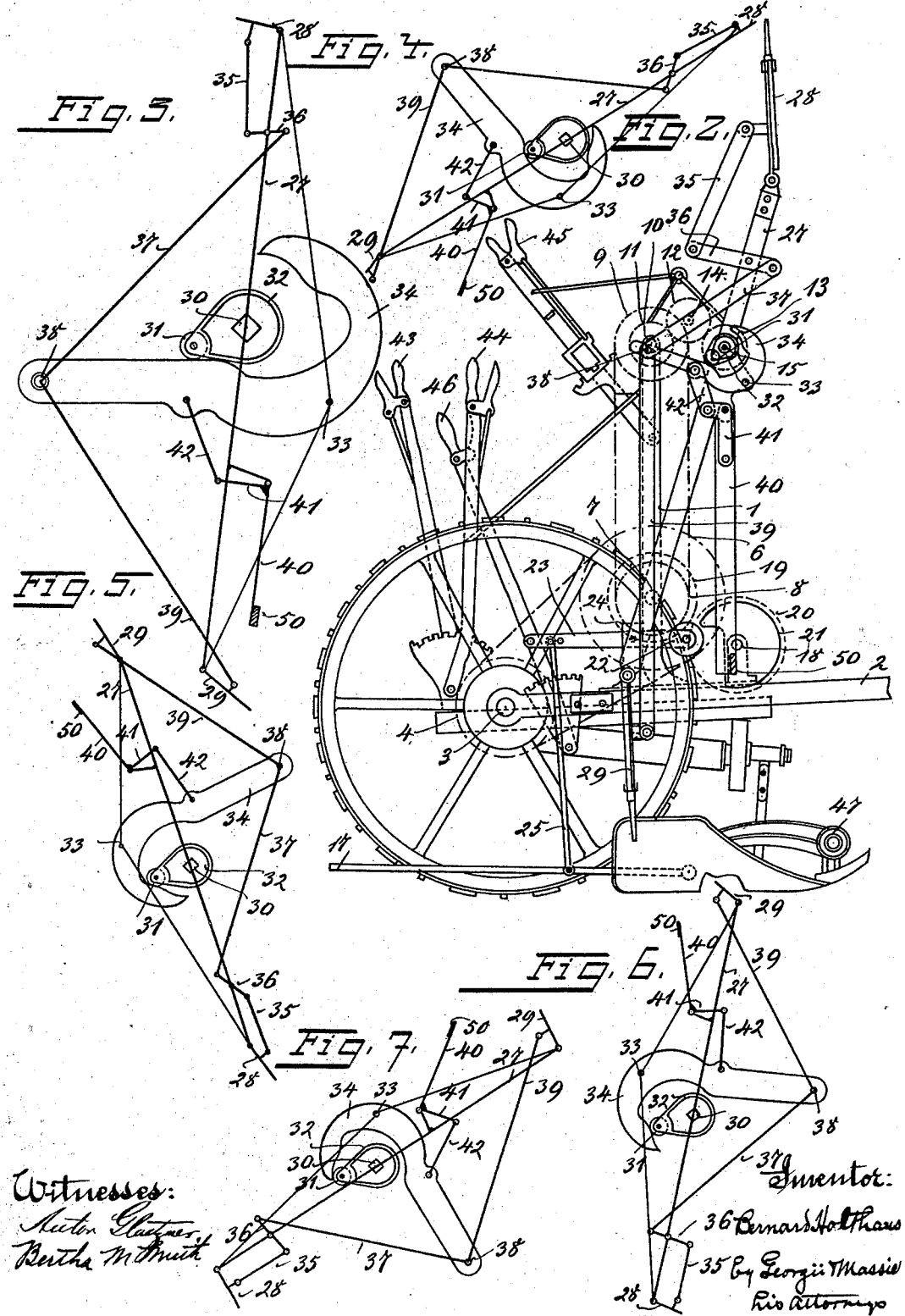

No. 748,556. PATENTED DEC. 29, 1903.
B. HOLTHAUS.
MOWING MACHINE.
APPLICATION FILED JUNE 1, 1903.
NO MODEL. 4 SHEETS—SHEET 3.
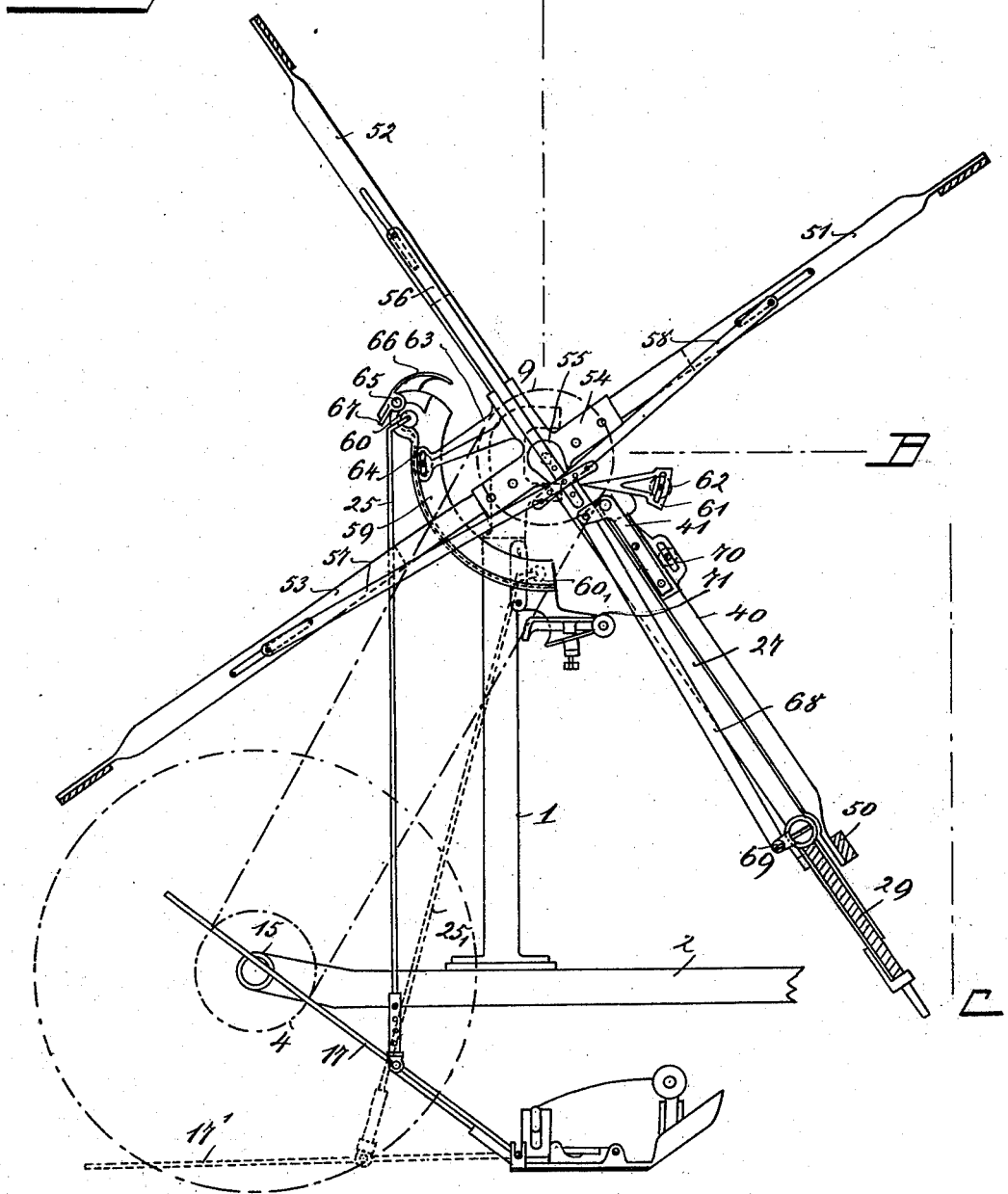

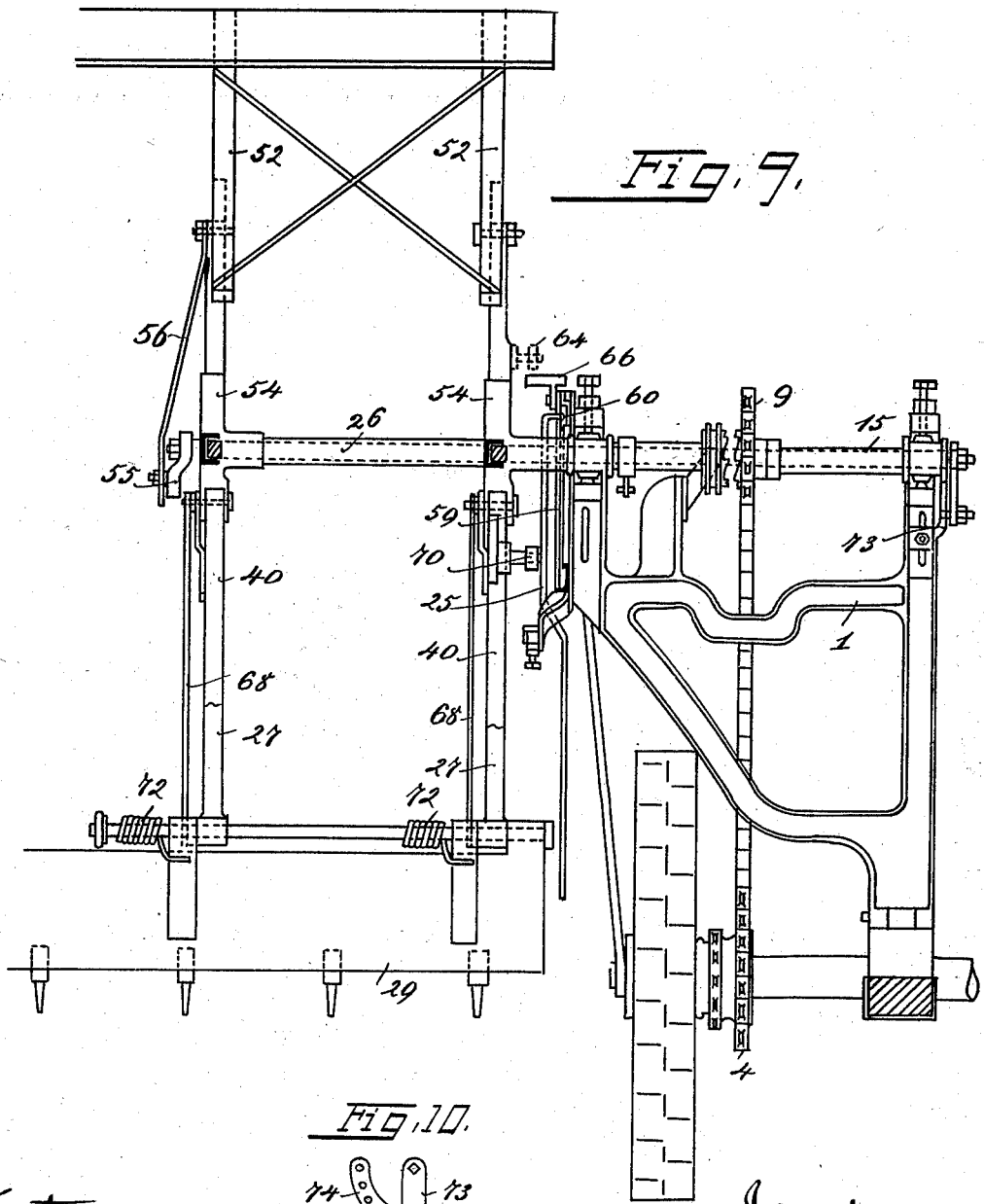

No. 748,556.

Patented December 29, 1903.

UNITED STATES PATENT OFFICE.

BERNARD HOLTHAUS, OF DINKLAGE, GERMANY.

MOWING-MACHINE.

SPECIFICATION forming part of Letters Patent No. 748,556, dated December 29, 1903.

Application filed June 1, 1903. Serial No. 159,702. (No model.)

*To all whom it may concern:*

Be it known that I, BERNARD HOLTHAUS, a citizen of Germany, residing at Dinklage, Oldenburg, Germany, have invented certain new and useful Improvements in Mowing-Machines; and I do hereby declare the following to be a full, clear, and exact description of the invention, such as will enable others skilled in the art to which it appertains to make and use the same.

This invention relates to harvesters; and its object is to improve the mechanism for receiving and delivering the cut stalks, so that freshly-cut stalks will be prevented from falling onto the rack while the stalks comprising the sheaf last cut are being delivered.

In order to render the present specification easily intelligible, reference is had to the accompanying drawings, in which similar reference-numerals denote similar parts throughout the several views.

Figure 1 is a front view of the machine. Fig. 1ª is a detail of a shaft having a squared end, and Fig. 2 a side elevation of Fig. 1. In Fig. 1 the levers shown in Fig. 2 are left out for the sake of greater clearness, and in both Figs. 1 and 2 various springs for counterpoising purposes well known are omitted for the same reason. In Fig. 1 the delivery-rack is shown turned up in order to more clearly illustrate other parts; but in use it should be turned down horizontally, as in Fig. 2. For the same reason the draft-pole and the cutters are shown in perspective. Figs. 3 to 7 show in a series of diagrams the means for operating the delivery-arms for the sheaves, while Fig. 8 is a side elevation of a modified form of the machine; Fig. 9, a sectional elevation on the line A B C of Fig. 8, and Fig. 10 a detail of certain parts provided for the adjustment of the reel.

3 is the axle for the ground-wheels, the rotation of which is transmitted by chain and chain-wheels to the receiving-rack 17 and to the delivery-arms. The transmission of motion to the receiving rack or tray 17 takes place in the following manner: The shaft 3 turns a chain-wheel 4, keyed thereto, and thus rotates the chain-wheel 6. A gear 19, attached to the spindle of the latter, meshes with gear 20, to the spindle 18 of which is attached a cam-disk 21, which serves to raise and lower the rack 17. The cam-disk is recessed, as shown, and engages one end of a double-arm lever 23, mounted on a pivot on the standard 24, which is fixed to the machine-frame. The opposite end of this lever is linked by a link 25 to the rack 17, and the end in engagement with the cam-disk carries a roll 22. When the cam-disk is rotated by the ground-wheel axle 3, the rack will be raised as long as the roll 22 of the lever 23 contacts with the full part of the disk 21 and will only be lowered when the roll passes into the recess of the cam, as will be understood on reference to the drawings, Fig. 2. The rack falls by gravity when the roll 22 enters the recess of the cam-disk. Motion is transmitted from the ground-axle 3 to the delivery-arms by means of a chain and cog-wheel gearing 8, 9, 11, 12, and 13, mounted on parallel shafts 7, 10, 14, and 15, which transmit rotation to the sleeve 26 on the shaft 15. The delivering-arms themselves are mounted on a frame 1, pivoted on the shaft 7 and carried by the draft-pole 2 and the ground-wheel axle 3. The shaft 7 is provided with a clutch-coupling 16, by means of which the delivering-arms and also the receiving-rack mechanism previously described may be thrown out of gear at any time.

The construction and operation of the delivering-arms (shown in Figs. 1 and 2) will now be described, reference being had to the diagrams shown in Figs. 3 to 7. The shaft 15 is fixed in the frame and is provided with a sleeve 26 rotatable thereon and carrying a gear 13, which rotates with the said sleeve. The beams 27 for the delivering arms or rakes 28 and 29 are mounted on the sleeve 26, the said rakes being movably attached to the said beams and moved by mechanism hereinafter set forth. These arms or rakes are actuated to deliver the sheaves in the manner usual in machines of the present class. The left-hand end of the stationary shaft 15, Fig. 3, is squared at 30, and fixed to the squared portion is a cam 32, carrying a roll 31. This roll serves to guide a hooked lever 34 during a portion of its movement, the said roll resting against the inner side of the said hooked lever, which latter is pivoted to the beam 27 at 33, and consequently rotates with the said beam.

28 is the rake for gathering up the stalks, this rake being linked to the pivot 38 of hooked lever 34 by a series of links and levers 35, 36, and 37, of which the lever 36 is pivoted to the beam 27. The delivering arm or rake 29 is also linked to the pivot 38 by means of the rod 39.

From the above it will be clear that when the sleeve 26 is rotated the beam 27, and with this the hooked lever 34, will also be turned. The latter will be guided by the roll 31, and thus the arms or rakes will be correspondingly moved relatively to the beam 27. To the latter, furthermore, an arm 40 is pivoted, having an arm 41 fast thereon, which is linked to the hooked lever 34 by means of the link 42, so that the said arm 40 will also be rotated with the other parts. Arm 40 carries a board 50, which serves to hold back the grain last cut until the previous sheaf has been taken up and delivered.

In Fig. 3 the arm or rake 29 is in its lowermost position. The rack 17 has been lowered by the action of the cam 21 and lies parallel with the ground, Fig. 2. The arm 29 now reaches out, owing to the further movement of the beam 27, and stands perpendicular to the ground, brushing the grain off the rack onto the ground. While the rake 29 is thus delivering the grain, the arm 40 is in a vertical position and holds back the stalks being cut. In Fig. 4 the rake 29 has delivered the grain, the arm 40 is taken back, and the rack 17 begins to rise (it rises to the extent of an angle of about thirty degrees.) The grain previously held back by the arm 40 now falls against the rack. The other rake 28 for taking up the grain now begins to reach out and in the position shown in Fig. 5 feeds the grain to the cutters. It is then thrown back, as shown in Fig. 6, in order to pass over the grain lying on the rack 17. Fig. 7 shows the position of the parts as the rake 29 descends, and the cycle of operations then commences again, the rack returning again to its horizontal position.

In order to adjust the receiving and delivering mechanisms to correspond to various heights of grain or grass to be cut or to meet different conditions of the ground, levers 43 44 45 46, Fig. 2, are provided. Lever 43 serves, as is usual, for raising the whole cutter apparatus, so that in the event of stones or other obstacles presenting themselves the whole device may be raised by depressing the foot-lever in the known manner. By means of the lever 44 the whole delivering device may be more or less turned around the shaft 7 and fixed in position. The reach of the rake-arms is thereby increased, so that short or storage grain can then be cut and delivered. The lever 45 serves for the same purpose. By means of this lever the upper part of the driving-gear may be adjusted in that the parts are swung around the shaft 10. By this means the reach of the apparatus may be still further increased. The lever 46 serves in the known way for tipping the cutter device around the pivot 47 in order to cut the grass or grain at different heights from the ground.

In addition to the chain-wheel 4 a second chain-wheel 5 may be provided, Fig. 1, so that according to which of the chain-wheels is thrown into gear the size of the sheaf deposited on the rack may be varied.

In Figs. 8, 9, and 10 a modification of the driving-gear for the rake-arms is shown, and the means for operating the rack are also modified. In this modification wings 51 52 53 are provided for reaching the grain and moving it toward the cutter. These wings are fixed to a star-wheel keyed to the hollow shaft 26 and consist of two parts, one of which is riveted to the star-wheel 54, while the other part (indicated by numerals 51, 52, and 53 in Figs. 8 and 9) is adapted to slide on the fixed part. The arms are advantageously made of iron bars of U-shaped cross-section. The stroke of each wing or blade is determined by a crank 55, mounted on the shaft 15, to which the movable parts 51, 52, and 53 are linked by means of rods 56, 57, and 58. The crank being stationary, the arms will be slid out and in on rotation of the sleeve 26. A segment-shaped guide-plate 59 is fixed to the machine-frame 1, and a roll 60 is adapted to run in this guide-plate, said roll being mounted on the top of the rod 25 for raising the rack 17. When the roll is in its lowest position, (indicated at 60',) the rack is down, and the roll is now raised again to its highest position, 60. The star-wheel 54 carries an extra arm 61, having a roll 62, which enters the segmental guide-plate 59 as the star rotates and pushes the roll 60' into its uppermost position, where it remains in a recess of the guide-plate (the rack being then in its raised position) until a second arm 63, with roll 64, operates the pawl pivoted at 65 to release the roll 60. When the roll 64 meets the end of the pawl at 66, the other end, 67, of the said pawl throws the roll 60 out of the recess in the guide-plate, and the rack falls of its own weight. (In Fig. 9 the roll 64 is shown in dotted lines in a different position to that shown in Fig. 8 for the sake of greater clearness.)

The movement of the arm 40 is effected in the following manner: Arm 40 is connected up by its arm 41 and rod 68 and arm 69 to the arm 27 and is consequently rotated with this rake. One of the arms 40 carries at a suitable position a roll 70, and the frame 1 or the guide-plate 59 is provided with a straight guideway 71. When the roll 70 engages the guideway 71, the arm will be temporarily detained and then pulled on by means of the rod 68 and arm 69 as the rake 29 delivers the grain. In order to enable the necessary relative movement of the arm 40 as regards the beam 27', the arm 69 is connected to the rake 29 and the latter is slightly movable in one direction, (to the right in Fig. 8,) being retained in its normal position by a spring 72. These springs yield when 70 contacts with 71. The parts are timed to operate in the following order: When the rake 29 is above the cutter device, the rack is in the position 17'. (Shown in dotted lines.) Arm 40 is arrested by 71 and is subsequently pulled on. The roll 62 now pushes the roll 60' into the position 60, so that the rack is moved to position 17, and the wings or blades 51 52 feed the grain to the cutters. The roll 64 then pushes aside the lever 66, so that the roll 60 is free to descend, and the rack falls by gravity to its lower position, as shown in dotted lines. In order to enable the blades carried by the arms 51 52 53 to feed the grain sooner or later, an adjusting device is provided. This device consists of a segment 74, having holes and being attached to the machine-frame, and of a lever 73, rotatably mounted on the shaft 15. The lever 73 may be adjusted on the segment 74, and thus the shaft 15 be retained in any desired position. It will be readily understood that this modification of the mowing-machine may also be adjustable to the height of the grain and to the various conditions of the ground.

I claim as my invention—

1. In a harvester, the combination, with a reel, a depository for cut grain, and means carried by the reel and operating to discharge the grain from the depository, of means carried by the reel and operating to withhold the deposit of freshly-cut grain during such discharge.

2. In a harvester, the combination, with a depository for cut grain, of a reel, a rake pivotally mounted thereon, a bar carried by the reel and movable relative thereto, and means operating to simultaneously actuate the rake and the bar, whereby the cut grain will be discharged from the depository and the deposit of freshly-cut grain thereon will be withheld during such discharge.

3. In a harvester, the combination, with a depository for cut grain, of a reel, a rake pivotally mounted thereon, a transverse bar pivotally mounted on the reel, a lever mounted on the reel, a cam bearing against said lever, and connections between the lever and the bar and rake to cause the rake to discharge the grain from its depository and the transverse bar to withhold the deposit of freshly-cut grain during such discharge.

4. In a harvester, the combination, with a depository for cut grain, of a rotary reel, a rake pivotally mounted thereon, a transverse bar movably mounted on the reel in such position as to follow the rake in its movement, a lever mounted on the reel, and a cam mounted on the axis of the reel and bearing upon the lever, and connections between the lever and the rake and the bar whereby the rake will be periodically actuated relative to the reel in such manner as to discharge the cut grain from its depository and the transverse bar will be temporarily retarded in its movement in such manner as to withhold the deposit of freshly-cut grain during such discharge.

5. In a harvester, the combination, with a depository for cut grain, of a rotary reel, a rake pivotally mounted thereon, arms movably mounted upon the reel, a transverse bar carried by the arms, a hook-lever mounted on the reel, a link connection between its free end, and the rake, a link connection between said lever and the arms carrying the transverse bar, and a cam mounted upon the axis of the reel and bearing upon the inner surface of the hook-lever, whereby the rake will be periodically actuated relative to the reel to facilitate the discharge of the grain from its depository and the transverse bar will be temporarily retarded in its movement to withhold the deposit of freshly-cut grain during such discharge.

6. In a harvester, the combination, with a depository for cut grain, consisting of a platform, means for periodically raising and lowering the platform, and a reel, of means carried by the reel and operating to discharge the grain from the platform simultaneously with the lowering thereof, and means carried by the reel and operating to withhold the deposit of freshly-cut grain during such discharge.

7. In a harvester, the combination, with a depository for cut grain, consisting of a platform, and means for periodically raising and lowering the same, comprising a lever and a cam operated from the driving-shaft, of a reel, a rake pivotally mounted thereon, a transverse bar movably mounted upon the reel in such position as to follow the rake in its movement, and means operating simultaneously with the lowering of the platform to actuate the rake and bar, so as to facilitate the discharge of the grain from the platform and to withhold the deposit of freshly-cut grain during such discharge.

8. In a harvester, the combination, with a platform for the deposit of cut grain and means for periodically raising and permitting the lowering of the same, comprising a driven cam, a lever so arranged as to be actuated by the cam, and a connection between the lever and platform, of a reel, and means carried by the reel and operating simultaneously with the lowering of the platform to temporarily withhold the deposit of freshly-cut grain.

9. In a harvester, the combination, with a platform for the deposit of cut grain, and means for periodically raising the platform and permitting the same to fall and comprising a cam operated from the driving-shaft, a pivoted lever, a roll carried by one arm of the lever and traveling over the face of the cam, and a connection between the other arm of the lever and the platform, of a reel, and means carried thereby and operating simultaneously with the lowering of the platform for temporarily withholding the deposit of freshly-cut grain.

In testimony whereof I affix my signature to this specification in the presence of two witnesses.

B. HOLTHAUS.

Witnesses:
F. A. BRYCE,
FR. HOYERMANN.